(12) United States Patent
Suleman et al.

(10) Patent No.: US 10,966,071 B2
(45) Date of Patent: Mar. 30, 2021

(54) SYSTEM AND METHOD FOR COORDINATING AN AGRICULTURAL OPERATION

(71) Applicant: CNH Industrial America LLC, New Holland, PA (US)

(72) Inventors: Yaseen Suleman, Glendale Heights, IL (US); Brett Carson McClelland, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 37 days.

(21) Appl. No.: 16/203,936

(22) Filed: Nov. 29, 2018

(65) Prior Publication Data

US 2020/0178049 A1 Jun. 4, 2020

(51) Int. Cl.
| | |
|---|---|
| G06F 7/00 | (2006.01) |
| H04W 4/46 | (2018.01) |
| G01C 21/36 | (2006.01) |
| G06F 3/0482 | (2013.01) |

(52) U.S. Cl.
CPC ............ *H04W 4/46* (2018.02); *G01C 21/367* (2013.01); *G06F 3/0482* (2013.01)

(58) Field of Classification Search
CPC ....... H04W 4/46; G01C 21/367; G06F 3/0482
See application file for complete search history.

(56) References Cited

U.S. PATENT DOCUMENTS

2012/0174445 A1* 7/2012 Jones .................. A01B 69/007
 37/197
2018/0035374 A1* 2/2018 Borden ............. H04W 52/0229

\* cited by examiner

*Primary Examiner* — Adam M Alharbi
(74) *Attorney, Agent, or Firm* — Rickard K. DeMille; Rebecca L. Henkel

(57) ABSTRACT

A control system of a first agricultural system includes a first controller having a processor and a memory. The first controller is configured to instruct a display to present a map of a work area, in which the map includes a selectable icon corresponding to a second agricultural system, and the selectable icon is positioned at a location on the map corresponding to a position of the second agricultural system within the work area. The first controller is also configured to receive selection of the selectable icon, to output a request to pair with the second agricultural system in response to receiving the selection, and to pair the first agricultural system with the second agricultural system in response to receiving a pairing confirmation from the second agricultural system.

17 Claims, 7 Drawing Sheets

SYSTEM AND METHOD FOR COORDINATING AN AGRICULTURAL OPERATION

BACKGROUND

The subject matter disclosed herein relates generally to a system and method for coordinated an agricultural operation.

Agricultural vehicles (e.g., work vehicles) may perform certain agricultural operations individually or in teams. For example, a single agricultural vehicle may perform any number of operations (e.g., towing a seeder or planter, harvesting crops, tilling land, etc.). Alternatively, one or more agricultural vehicles may coordinate operations between one another to facilitate completing tasks (e.g., tilling a field, harvesting crops, excavating the ground, unloading harvested crops, etc.). Furthermore, the agricultural vehicles operating individually or as a team may be autonomous (e.g., partially or fully) or controlled by an operator (e.g., a driver). In some instances, it may be advantageous for the agricultural vehicles to operate as a team because the vehicles may accomplish a task more quickly and efficiently. However, establishing and coordinating suitable operations in a field between the agricultural vehicles may be difficult, thereby reducing the efficiency of agricultural operations performed by the team.

BRIEF DESCRIPTION

In certain embodiments, a control system of a first agricultural system includes a first controller having a processor and a memory. The first controller is configured to instruct a display to present a map of a work area, in which the map includes a selectable icon corresponding to a second agricultural system, and the selectable icon is positioned at a location on the map corresponding to a position of the second agricultural system within the work area. The first controller is also configured to receive selection of the selectable icon, to output a request to pair with the second agricultural system in response to receiving the selection, and to pair the first agricultural system with the second agricultural system in response to receiving a pairing confirmation from the second agricultural system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
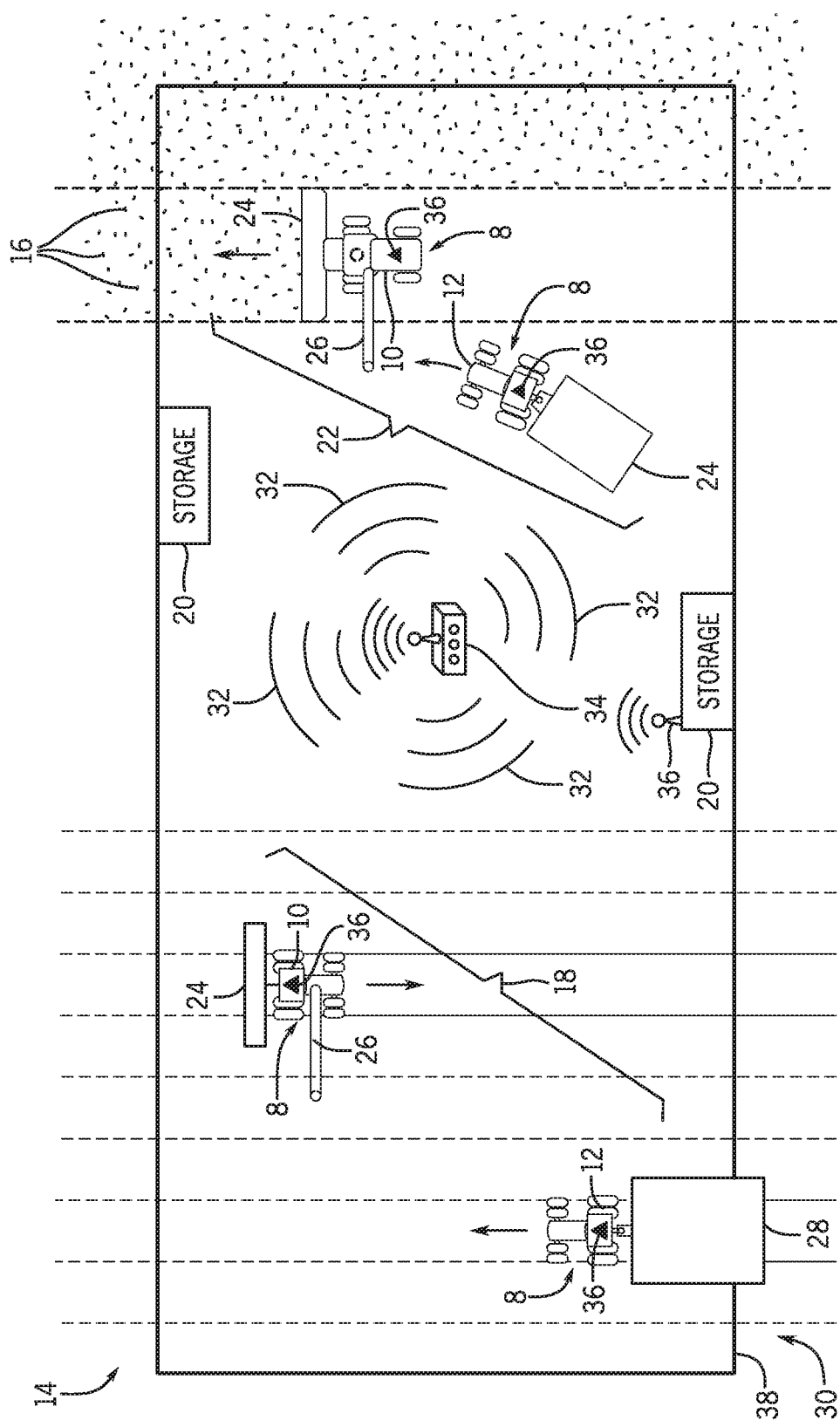
FIG. 1 is a schematic view of an embodiment of various agricultural vehicles communicatively coupled to one another via a network using a communication protocol.

FIG. 1 is a schematic view of an embodiment of various agricultural vehicles 8 (e.g., agricultural systems) communicatively coupled to one another via a network using a communication protocol. In the illustrated embodiment, a first agricultural vehicle 10 and a second agricultural vehicle 12 are configured to operate in a field 14, for example, to accomplish tasks, such as harvesting and unloading crops 16. In some embodiments, the first and second agricultural vehicles 10, 12 may be compatible with one another, thereby facilitating pairing between the two agricultural vehicles to more efficiently accomplish certain tasks. For example, the first agricultural vehicle 10 may be a harvester vehicle 10 configured to harvest crops 16, and the second agricultural vehicle 12 may be a haul vehicle 12 configured to dock with the harvester vehicle 10, receive the harvested crops from the harvester vehicle 10, and transport the harvested crops 16. Accordingly, the harvester vehicle 10 is compatible with the haul vehicle 12. As such, the harvester vehicle 10 and haul vehicle 12 may operate together as a first team 18 (e.g., by docking with one another and unloading the harvested crops 16), as discussed in detail below. As used herein "compatible" is used to refer to two devices, such as the harvester vehicle and haul vehicle, configured to coordinate operations. As discussed herein, the process of the harvester vehicle 10 and the haul vehicle 12 docking with one another, the haul vehicle 12 receiving the harvested crops 16 from the harvester vehicle 10, and the harvester vehicle 10 unloading the harvested crops to the haul vehicle 12 is hereinafter referred to as the "docking and unloading operation."

Indeed, the harvester and haul vehicles 10, 12 may pair with one another to collectively accomplish the unloading operation more quickly than operating individually. Hereinafter, when referring to two or more agricultural vehicles 8 working together as a "team," the team includes the two or more agricultural vehicles 8 joined via a communication protocol to coordinate operation. That is, a team refers to a series of members (e.g., machines, such as harvester and haul vehicles) working together and sharing data between one another. As used herein, "pair" refers to two members (e.g., machines, such as harvester and haul vehicles) of a team that will share more data as compared to the other members in the team that are not paired. However, it should be understood that in some embodiments, more than two members of the team may pair with one another. Additionally, "dock" refers to the act of actively coordinating position between the members. In some embodiments, members may dock after being paired with one another. For example, a haul vehicle and a harvester vehicle may dock to one another to facilitate harvesting crops 16.

With this in mind, any group of two or more agricultural vehicles 8 may establish the team. In some embodiments, agricultural vehicles within the team may pair with one another to more efficiently accomplish a task. While the embodiments disclosed herein are discussed in the context of agricultural vehicles paired within a team to coordinate docking and unloading operations, in some embodiments, the agricultural vehicles 8 may pair with one another whether or not they are on the same team. For example, there may be no teams within the field, such that the agricultural vehicles 8 may pair with one another absent any teams. While the embodiments disclosed herein are discussed in the context of two agricultural vehicles paired within a team to coordinate docking and unloading operations, in further embodiments, any suitable number of agricultural vehicles, such as three, four, five, ten, etc., (e.g., within one team or multiple teams) may be paired with one another to coordinate any suitable operation (e.g., tilling, ground working, seeding, planting, etc.).

In some embodiments, the haul vehicle 12 may pair and communicatively couple with a storage system 20 (e.g., agricultural system) to coordinate storage operations. As used herein, "storage operations" refers to the process whereby the haul vehicle 12 pairs with the storage system 20 to facilitate unloading the harvested crops 16 received from the harvester vehicle 10 into the storage system 20. The storage system 20 may be configured to receive the harvested crops 16 from the haul vehicle 12 and store the harvested crops 16. The storage system 20 may process, package, or perform any target operation on the harvested crops. In some embodiments, the storage system 20 may communicate data (e.g., via a corresponding transceiver), such as the percent of capacity, available space, whether another haul vehicle 12 is presently performing storage operations, and the like. This data may be communicated to the haul vehicle 12 paired with the storage system 20. While in the illustrated embodiment two storage systems 20 are included in the field 14, in further embodiments, any suitable number of storage systems, such as one, three, four, ten, etc., may be included in the field and configured to pair with the haul vehicle 12. In addition to pairing and communicatively coupling to one another and to storage systems 20, in further embodiments, the agricultural vehicles 8 may pair and communicate with other devices (e.g., using the communication protocol) to coordinate activity with those other devices (e.g., tablets, mobile device, computer devices, loading systems, repair systems, etc.).

In the illustrated embodiment, additional agricultural vehicles 8, such as the additional harvester vehicle 10 and the additional haul vehicle 12 may operate together as a second team 22 to accomplish certain tasks. In some embodiments, the agricultural vehicles in the second team 22 may pair with one another to accomplish a certain task, such as the above-mentioned docking and unloading operation. However, as mentioned above, in some embodiments, compatible agricultural vehicles 8 from the first team 18 and the second team 22 may pair with one another. For example, a harvester vehicle 10 from the first team 18 may pair with a haul vehicle 12 from the second team 22. To facilitate harvesting crops 16, the harvester vehicle 10 may include a harvesting unit 24 (e.g., head) positioned on the front of the harvester vehicle 10. The harvester vehicle 10 may include a conveyor 26 that outputs the harvested crops. Furthermore, the haul vehicle 12 may include a mobile storage compartment 28 (e.g., grain cart) to transport harvested crops to a suitable location, such as the storage system 20. The harvester vehicle 10 may pair to an unpaired and compatible haul vehicle 12 to more efficiently accomplish the docking and unloading operation. However, in alternative embodiments, any suitable number of agricultural vehicles and devices (e.g., storage systems) may form a team and/or pair to one another to accomplish any suitable task, such as the docking and unloading operation and the storage operation. For example, two, three, five, eight, ten, or any other suitable number of agricultural vehicle(s) and/or device(s) may form a team and/or pair with one another to coordinate accomplishment of any suitable task. In further embodiments, a base station controller may coordinate the operations of the agricultural vehicles and/or devices to accomplish any suitable task. The base station controller may communicate with a controller of any suitable agricultural vehicle. In some embodiments, the base station controller may receive communications from the agricultural vehicles 8 requesting to pair and enable the agricultural vehicles 8 to pair. Furthermore, the field 14 may include any suitable number of teams of agricultural vehicles 8 and/or devices (e.g., storage systems 20).

In some embodiments, communication (e.g., requests to pair, requests to form teams, etc.) between the agricultural vehicle(s) and the storage system(s) 20 may be enabled within a network 30 using a communication protocol 32. In some embodiments, a team leader may be assigned. Any of the agricultural vehicles 8 may be the "team leader." Any agricultural vehicle may create the team and any other vehicle(s) may join the team. In some embodiments, the team may not include a team leader. For example, the team may remain when the team leader leaves the team (e.g., if other agricultural vehicles remain in the team). In further embodiments, the team leader may be treated like a member of the team. In the illustrated embodiment, the harvester vehicle 10 may be the "team leader" of the first team 18 and the other harvester vehicle 10 may be the "team leader" of the second team 22. In some embodiments, the team leader may generate a new team that enables pairing between agricultural vehicles 8 within the team via the communication protocol 32. As mentioned above, in some embodiments, the teams may be omitted, such that the agricultural vehicles 8 may pair absent any teams. In some embodiment, the communication protocol 32 includes a wireless local area network (WLAN) protocol, a Bluetooth protocol, a cellular protocol, another suitable standard and/or proprietary protocol, or a combination thereof. The communication protocol 32 may be supported by an Ad-Hoc network, an Access Point network, a Mesh network, or a combination thereof. Furthermore, the network 30 may be established by a communication device 34. In some embodiments, the communication device 34 (e.g., a transceiver) may be on an agricultural vehicle 8, such that the agricultural vehicle establishes the network 30. That is, in some embodiments, the network 30 may be established by any agricultural vehicle using the communication device 34. In some embodiments, a controller may establish the network 30.

In some embodiments, each agricultural vehicle 8 and/or device (e.g., storage system 20) in the field may include a respective transceiver 36 enabling the agricultural vehicle/device to wirelessly broadcast information. For example, as discussed in detail below, the harvester vehicle 10 may send a request to pair with an available haul vehicle 12 to perform the docking and unloading operation. Upon receipt of a confirmation from the haul vehicle 12 to pair, the requesting harvester vehicle 10 and the confirming haul vehicle 12 pair with one another to perform the docking and unload operation. In some embodiments, the haul vehicle 12 may send a request to pair with an available harvester vehicle 10 to perform the docking and unloading operation. Additionally, in some embodiments, the haul vehicle 12 may send a request to pair with the storage system 20 to perform the storage operation.

As mentioned above, communication may be enabled via the network 30. In some embodiments, an operator of the agricultural vehicle 8 may interact with a user interface including a display to view a map of the field 14. This map may include information associated with the agricultural vehicles 8 present on the map. In some embodiments, the map of the field 14 may include selectable icons corresponding to the agricultural vehicles 8 within the field. Selection of each icon causes the display to present information associated with the agricultural vehicle 8 corresponding to the selected icon. Based on the information associated with the agricultural vehicles 8, the operator may select an agricultural vehicle 8 to pair with to accomplish any suitable task (e.g., docking and unloading operation, storage operation, etc.). In some embodiments, the map may be updated at or near real-time.

The network 30 may enable communication of data between the agricultural vehicles 8 using the communication protocol 32. For example, in some embodiments, each agricultural vehicle 8 connected to the network 30 may communicate data such as a name, a pairing status (e.g., paired or unpaired), a connection strength, a position, the type of agricultural vehicle, a heading, a role (e.g., relative to other agricultural vehicles 8 in the network 30), a calibration status (e.g., whether an agricultural vehicle 8 is ready to be paired), a distance to other vehicles and/or to compatible agricultural vehicles 8 (e.g., a distance from a harvester vehicle 10 to a haul vehicle 12), or a combination thereof, associated with the agricultural vehicle 8. Furthermore, other data, such as yield, obstacles, boundaries, swath(s), test messages, images, and the like, may be communicated between the agricultural vehicles using the network. The agricultural vehicles 8 may also communicate any other suitable data.

Furthermore, in some embodiments, specialized data may be communicated between paired agricultural vehicles (e.g., the agricultural vehicles 8 within a team). For example, the specialized data may include information that may not be communicated if the agricultural vehicles 8 were not paired. That is, certain data may be restricted to only agricultural vehicles paired, such that unpaired agricultural vehicles may be restricted from sharing certain information or coordinating operation with the paired agricultural vehicles. In some embodiments, the agricultural vehicles 8 may share a first set of information within a network, the agricultural vehicles may share a second set of information within the team, the agricultural vehicles may share a third set of information with paired agricultural vehicle(s), or any combination thereof. The first, second, and third sets of information may include different information or the same information.

In some embodiments, the network 30 may include a coverage area 38. The agricultural vehicles 8 within the bounds of the coverage area 38 that have accessed the network 30 may communicate data with each other, present a map of the other agricultural vehicles within the field 14 (having access to the network 30), send a request to pair with a compatible agricultural vehicle, perform tasks (e.g., docking and unloading operation, storage operation, etc.) with the paired agricultural vehicle, or any combination thereof. The network 30 may have any suitable coverage area 38. For example, the coverage area 38 may substantially cover a portion of the field 14 or the entire field 14. In some embodiments, there may be multiple teams in the same coverage area. In the illustrated embodiment, the size of the coverage area 38 is not drawn to scale and is depicted to facilitate discussion.

In some embodiments, communicating (e.g., exchanging) data between the agricultural vehicles 8 (e.g., the harvester vehicle 10 and the haul vehicle 12) may enhance operations. Data communicated between the agricultural vehicles 8 may include the position of each agricultural vehicle 8, the distance away from other agricultural vehicles 8 having access to the network 30, and the like, such that the agricultural vehicles 8 may have access to information indicative of the position of the other agricultural vehicles 8 in the field 14. For example, each agricultural vehicle may use the position information to maintain a distance from other agricultural vehicles 8 to substantially reduce or eliminate the possibility of interference with the other agricultural vehicles 8. Additionally, in some embodiments, communicating data, such as the role of one agricultural vehicle 8 to other agricultural vehicles 8 may facilitate coordinating operations in teams. For example, in the illustrated embodiment, the harvester vehicle 10 may output harvested crops 16 from of the conveyor 26, and the storage compartment 28 (e.g., grain cart) of the haul vehicle 12 may transport harvested crops 16 to a suitable location (e.g., the storage system 20). As such, the harvester vehicle 10 may coordinate operations with the haul vehicle 12 (e.g., in response to an operator request to pair the harvester vehicle 10 to the haul vehicle 12 and an operator confirmation from the haul vehicle 12). In some embodiments, pairing may be enabled on demand. In further embodiments, paired members may unpair (e.g., automatically or manually after a task is completed). After unpairing, the unpaired vehicles may automatically send a request to pair with another unpaired agricultural vehicle to again perform a task (e.g., the docking and unloading operation).

In some embodiments, communication between agricultural vehicles 8 (e.g., two agricultural vehicle) may lead to forming a team. The agricultural vehicles 8 may pair if the agricultural vehicles in the team are compatible and may work together (e.g., coordinate operations). For example, by communicating data indicative of their respective roles, the harvester vehicle 10 and the haul vehicle 12 may pair to one another, such that the haul vehicle 12 joins the team (e.g., the second team 22) hosted by the harvester vehicle in the network 30. As such, the harvester and haul vehicles 10, 12 may operate as the second team 22, such that that the harvester vehicle 10 harvests the crops 16, and the haul vehicle 12 receives the harvested crops 16 and transports the crops to a suitable location (e.g., the storage system 20) after receiving the crops from the harvester vehicle 10 via the conveyor 26.

In some embodiments, the pairing of agricultural vehicles 8 to coordinate operations to achieve a task may be based on their respective roles, which are communicated via the network 30. For example, in some embodiments, the harvester vehicles 10 may only pair with other agricultural vehicles 8 identified as haul vehicles 12. That is, in some embodiments, the haul vehicles 12 may only form a team with haul vehicles 12 and harvester vehicles 10, and harvester vehicles 10 may only form a team with haul vehicles 12 and harvester vehicles 10. While, in the illustrated embodiment, only agricultural vehicles 8 and the storage system 20 are shown communicatively coupled to the network 30, in further embodiments, other devices, such as mobile devices, computers, other motor vehicles, repair systems, loading systems, and the like, may also be communicatively coupled to the network 30 using the communication protocol 32.

Figure 2:
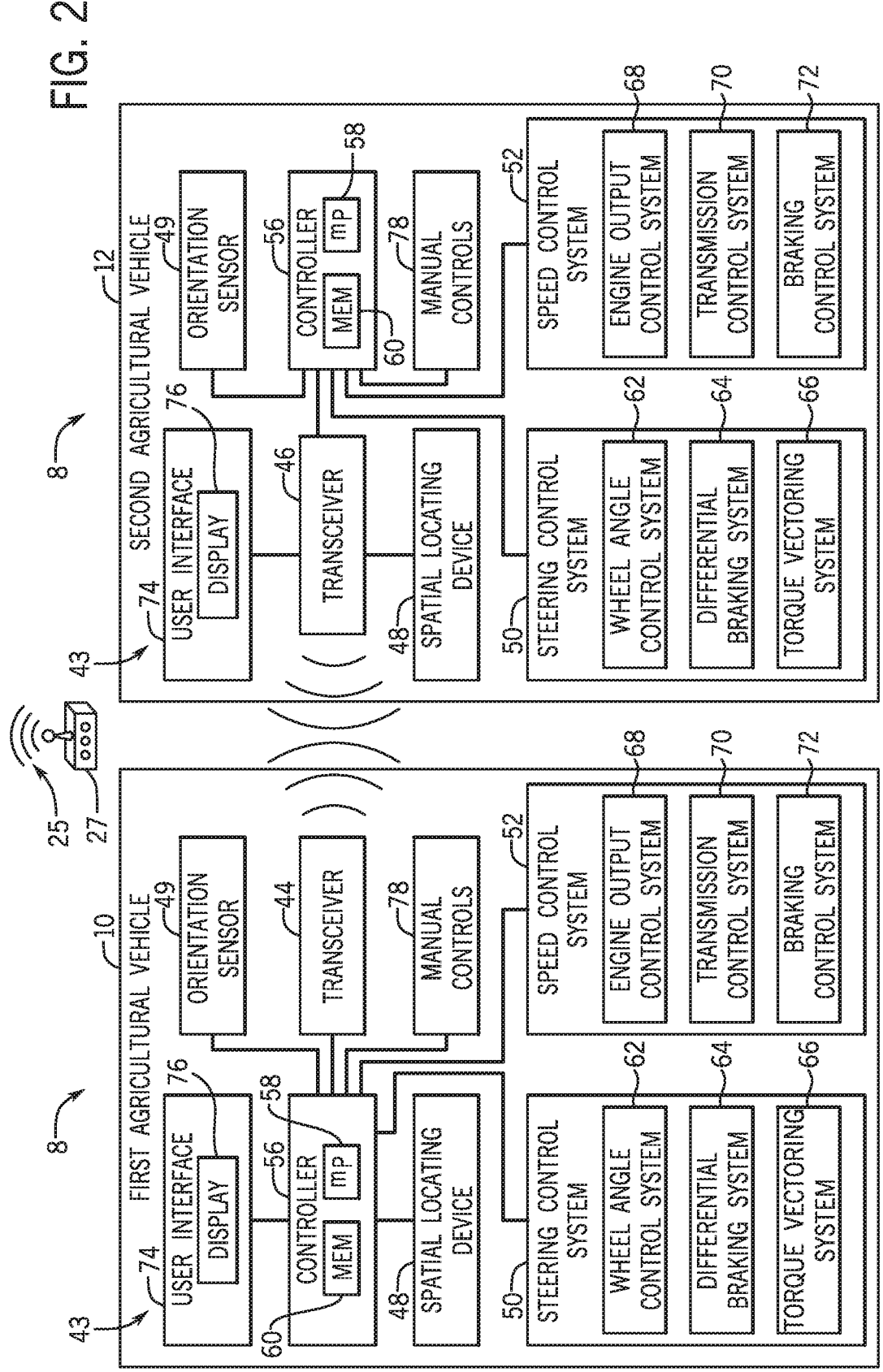
FIG. 2 is a schematic diagram of an embodiment of a first agricultural vehicle and a second agricultural vehicle of the agricultural vehicles of FIG. 1 configured to pair with one another.

FIG. 2 is a schematic diagram of an embodiment of a first agricultural vehicle 10 and a second agricultural vehicle 12 of the agricultural vehicles 8 of FIG. 1 configured to pair with one another. In some embodiments, the first agricultural vehicle 10 may be a harvester vehicle 10, and the second agricultural vehicle 12 may be a haul vehicle 12. Furthermore, while harvester and haul vehicles 10, 12 are described as being communicatively coupled, in further embodiments, any of a number of agricultural vehicles and/or devices (e.g., the storage system, mobile computing devices, computers, base station controllers, etc.) within the field may communicatively couple with one another.

In the illustrated embodiment, the harvester vehicle 10 and the haul vehicle 12 each include a control system 43. In the illustrated embodiment, the harvester vehicle 10 may be the team leader (e.g., the agricultural vehicle that establishes the first team 18). Additionally or alternatively, the harvester vehicle 10 may be the requesting agricultural vehicle requesting to pair with an available and compatible agricultural vehicle, such as the haul vehicle 12. After requesting to pair and upon receipt of approval (to pair) from the haul vehicle 12, the control system 43 of the harvester vehicle 10 may communicate with the control system 43 of the haul vehicle 12 to coordinate activities and accomplish the docking and unloading operation. The first transceiver 44 of the harvester vehicle 10 is configured to facilitate and/or enable communication with a second transceiver 46 of the haul vehicle 12 using the communication protocol 32. As mentioned above, in some embodiments, the agricultural vehicles may only communicate with other agricultural vehicles on the same team, but in further embodiments, any agricultural vehicle having access to the network 30 may communicate with any other agricultural vehicle having access to the network 30. In yet additional embodiments, a first subset of data may be communicated between agricultural vehicles on the same team, a second subset of data may be communicated between agricultural vehicles having access to the network, and a third subset of data may be communicated between paired agricultural vehicles. For example, two harvester vehicles 10 and two haul vehicles 12 may be communicatively coupled in the first team 18, such that a first subset of data may be communicated only between these agricultural vehicles because they are members of the first team 18. In another example, a second subset of data may be communicated between all agricultural vehicles having access to the network because they have access to the network (e.g., despite not being in the same a team or being paired). In yet another example, the harvester and haul vehicles 10, 12 may pair with one another, such that the third subset of data is communicated between these paired agricultural vehicles 8.

Furthermore, the first and second transceivers 44, 46 may operate at any suitable frequency range within the electromagnetic spectrum. For example, in certain embodiments, the transceivers may broadcast and receive radio waves within a frequency range of about 1 GHz to about 10 GHz. In addition, the first and second transceivers 44, 46 may utilize any suitable communication protocol 32, such as a standard protocol (e.g., Wi-Fi, Bluetooth, etc.) or a proprietary protocol.

As mentioned above, the agricultural vehicles 8 communicatively coupled with one another using the communication protocol 32 may communicate data, such as position data and/or velocity data with one another. As used herein, "position" refers to a position vector, such as a one, two, or three-dimensional position vector. For example, a two-dimensional position vector may include latitude and longitude, and a three-dimensional position vector may include latitude, longitude, and altitude/elevation. The position vector may be represented in a rectangular, polar, cylindrical, or spherical coordinate system, among other suitable coordinate systems. In addition, as used herein, "velocity" refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. Similar to the position vector, the velocity vector may be represented in a rectangular, polar, cylindrical, or spherical coordinate system, among other suitable coordinate systems. In certain embodiments, the velocity may be represented as a unit/normalized vector (e.g., a vector having a unit magnitude). In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

In the illustrated embodiment, the control system 43 of each of the harvester and haul vehicles 10, 12 includes a spatial locating device 48, which is mounted to the respective agricultural vehicle and configured to facilitate determining the position and velocity. The spatial locating device 48 may include any suitable system configured to measure the position and, in certain embodiments, the velocity of the agricultural vehicle, such as a global positioning system (GPS), for example. In certain embodiments, the spatial locating device 48 may be configured to measure the position and velocity of the agricultural vehicle relative to a fixed point within a field (e.g., via a fixed radio transceiver). Accordingly, the spatial locating device 48 may be configured to measure the position and velocity of the agricultural vehicle relative to a fixed global coordinate system (e.g., via the GPS) or a fixed local coordinate system. In certain embodiments, the first and second transceivers 44, 46 are configured to broadcast the position, velocity, and other information discussed below to other agricultural vehicles 8 within the coverage area.

In addition, the control system 43 of each of the harvester and haul vehicles 10, 12 includes a respective orientation sensor 49 configured to determine a pitch angle, a yaw angle, a roll angle, or a combination thereof, of the agricultural vehicle. For example, the orientation senor 49 may include a gyroscope or other suitable sensor(s) configured to monitor the orientation of each agricultural vehicle. In certain embodiments, the orientation sensor 49 is also configured to determine a pitch rate, a yaw rate, a roll rate, or a combination thereof. Furthermore, in certain embodiments, the respective orientations of the agricultural vehicles may be communicated to other agricultural vehicles 8 via the network 30. In some embodiments, the agricultural vehicle control system 43 is configured to compare the orientation (e.g., pitch angle, yaw angle, roll angle, or a combination thereof) of the harvester vehicle 10 to the orientation (e.g., pitch angle, yaw angle, roll angle, or a combination thereof) of the haul vehicle 12, for example, to coordinate operations between the harvester vehicle 10 and the haul vehicle 12. As mentioned above, similar techniques may be used with respect to other agricultural vehicles 8 or devices (e.g., the storage system 20) within the field 14.

In the illustrated embodiment, the control system 43 of each of the harvester and haul vehicles 10, 12 includes an automated steering control system 50 configured to control a direction of movement of the respective agricultural vehicle 8, and an automated speed control system 52 configured to control a speed of the respective agricultural vehicle 8. In addition, each control system 43 includes a controller 56 communicatively coupled to the corresponding transceiver (e.g., first transceiver 44 or second transceiver 46), to the spatial locating device 48, to the automated steering control system 50, and to the automated speed control system 52. The controller 56 is configured to automatically control certain features of the respective agricultural vehicle 8 (e.g., the harvester vehicle 10 or the haul vehicle 12). The controller 56 may also enable an operator to access the agricultural vehicle 8 (e.g., interact with certain components of the agricultural vehicle, control the agricultural vehicle, or a combination thereof), in some instances, after the operator provides login credentials. For example, the controller 56 may identify that an operator has accessed the agricultural vehicle 8, and the controller 56 may prompt the operator (e.g., via a user interface) to input login credentials to access (e.g., to communicatively couple to) the network 30. In some embodiments, after gaining access to the agricultural vehicle 8, the operator may provide login information to access the existing network 30. The controller 56 may instruct a user interface to present a map of the field, including the agricultural vehicles 8 within the field presented on the map as corresponding icons. The map may include information indicating which agricultural vehicles 8 are available for pairing. Accordingly, in some embodiments, an operator may log into the agricultural vehicle 8 and also log into the network 30, and submit requests to pair with available and compatible agricultural vehicles 8. In some embodiments, the operator may access the agricultural vehicle and/or the network without providing login credentials.

Alternatively or in addition, the controller 56 may enable an operator to establish a new team on the network 30, in which the agricultural vehicle 8 that the operator accessed becomes the team leader (e.g., establishes a new team that may be joined by one or more other vehicles). Furthermore, the controller 56 may enable the communication of data to and from other agricultural vehicles 8 communicatively coupled to the team leader via the network 30. As mentioned above, communication between agricultural vehicles may be enabled within the network 30 via corresponding transceivers.

In certain embodiments, the controller 56 is an electronic controller having electrical circuitry configured to process data from the transceiver 44, the spatial locating device 48, and/or the other components of the control system 43. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the agricultural vehicle 8, for enabling pairing between the agricultural vehicles 8, for completing docking and unloading operations, for completing storage operations, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random-access memory (RAM), and/or a nonvolatile memory, such as read-only memory (ROM). The memory device 60 may store a variety of information and may be used for various purposes. For example, the memory device 60 may store processor-executable instructions (e.g., firmware or software) for the processor 58 to execute, such as instructions for controlling the agricultural vehicle 8, for enabling pairing between the agricultural vehicles 8, for completing docking and unloading operations, for completing storage operations, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, identification data, etc.), instructions (e.g., software or firmware for controlling the agricultural vehicle, etc.), and any other suitable data.

In the illustrated embodiment, the automated steering control system 50 includes a wheel angle control system 62, a differential braking system 64, and a torque vectoring system 66. The wheel angle control system 62 may automatically rotate one or more wheels of the agricultural vehicle 8 (e.g., via hydraulic actuators) to steer the agricultural vehicle 8 along a desired route. By way of example, the wheel angle control system 62 may rotate front wheels, rear wheels, and/or intermediate wheels of the agricultural vehicle 8, either individually or in groups. The differential braking system 64 may independently vary the braking force on each lateral side of the agricultural vehicle 8 to direct the agricultural vehicle 8 along the desired route. Similarly, the torque vectoring system 66 may differentially apply torque from an engine to wheels and/or tracks on each lateral side of the agricultural vehicle 8, thereby directing the agricultural vehicle 8 along a desired route. While the illustrated steering control system 50 includes the wheel angle control system 62, the differential braking system 64, and the torque vectoring system 66, alternative embodiments may include one or two of these systems, in any suitable combination. Further embodiments may include an automated steering control system 50 having other and/or additional systems to facilitate directing the agricultural vehicle 8 along the desired route.

In the illustrated embodiment, the speed control system 52 includes an engine output control system 68, a transmission control system 70, and a braking control system 72. The engine output control system 68 is configured to vary the output of the engine to control the speed of the agricultural vehicle 8. For example, the engine output control system 68 may vary a throttle setting of the engine, a fuel/air mixture of the engine, a timing of the engine, and/or other suitable engine parameters to control engine output. In addition, the transmission control system 70 may adjust gear selection within a transmission to control the speed of the agricultural vehicle 8. Furthermore, the braking control system 72 may adjust braking force, thereby controlling the speed of the agricultural vehicle 8. While the illustrated automated speed control system 52 includes the engine output control system 68, the transmission control system 70, and the braking control system 72, alternative embodiments may include one or two of these systems, in any suitable combination. Further embodiments may include an automated speed control system 52 having other and/or additional systems to facilitate adjusting the speed of the agricultural vehicle.

In the illustrated embodiment, the agricultural vehicle control system 43 includes a user interface 74 communicatively coupled to the controller 56. The user interface 74 is configured to selectively instruct the controller 56 to join the team of the team leader in response to user input. The user interface 74 is also configured to selectively instruct the controller 56 to become a team leader, thereby creating a new team that enables one or more other agricultural vehicles to join. For example, the user interface 74 may prompt an operator to input login credentials (e.g., a password) to access the feature(s) that enable the agricultural vehicle 8 (e.g., the harvester vehicle 10) to log into the network, to establish a new team, to join an existing tea, and the like. The user interface 74 may prompt the operator to join an existing team hosted by a team leader and/or to create a new team (e.g., become a new team leader). In some embodiments, the user interface 74 may prompt the operator to establish the network 30. In certain embodiments, the user interface includes a display 76 configured to present data to the operator, such as the name of the agricultural vehicle 8, the state of the agricultural vehicle 8 (e.g., fuel consumption, maximum torque, operation mode, etc.), the strength of the network signal, a distance to other agricultural vehicles 8, a role of the agricultural vehicle 8 relative to other agricultural vehicles 8 in the network (e.g., communication network) and/or the team, a calibration status (e.g., whether an agricultural vehicle 8 is ready to be paired), or any combination thereof. In further embodiments, the display 76 may depict any suitable data communicated via the network and/or available from systems of the agricultural vehicle. In some embodiments, the display 76 may include a touch screen display. The display 76 may be a liquid crystal display (LCD), a light-emitting diode (LED) display, a cathode ray tube (CRT), an image projection device, a plasma display, or any other type of display or device capable of presenting an image visible to an operator. In some embodiments, the display 76 may not be touch compatible. Instead, one or more input peripherals, such as buttons, dials, touch pads, keyboards, a mouse, microphones, and the like may be included in the user interface 74 and used to control the display 76.

As illustrated, the agricultural vehicles 8 includes manual controls 78 configured to enable an operator to control the agricultural. The manual controls 78 may include manual steering control, manual transmission control, and/or manual braking control, or a combination thereof, among other controls. In the illustrated embodiment, the manual controls 78 are communicatively coupled to the controller 56. The controller 56 is configured to disengage automatic control of the agricultural vehicle upon receiving a signal indicative of manual control of the agricultural vehicle. However, in further embodiments, the manual controls or any of the aforementioned components (e.g., the speed control system, the torque vectoring system 66, etc.) of the agricultural vehicle 8 may be omitted.

Figure 3:
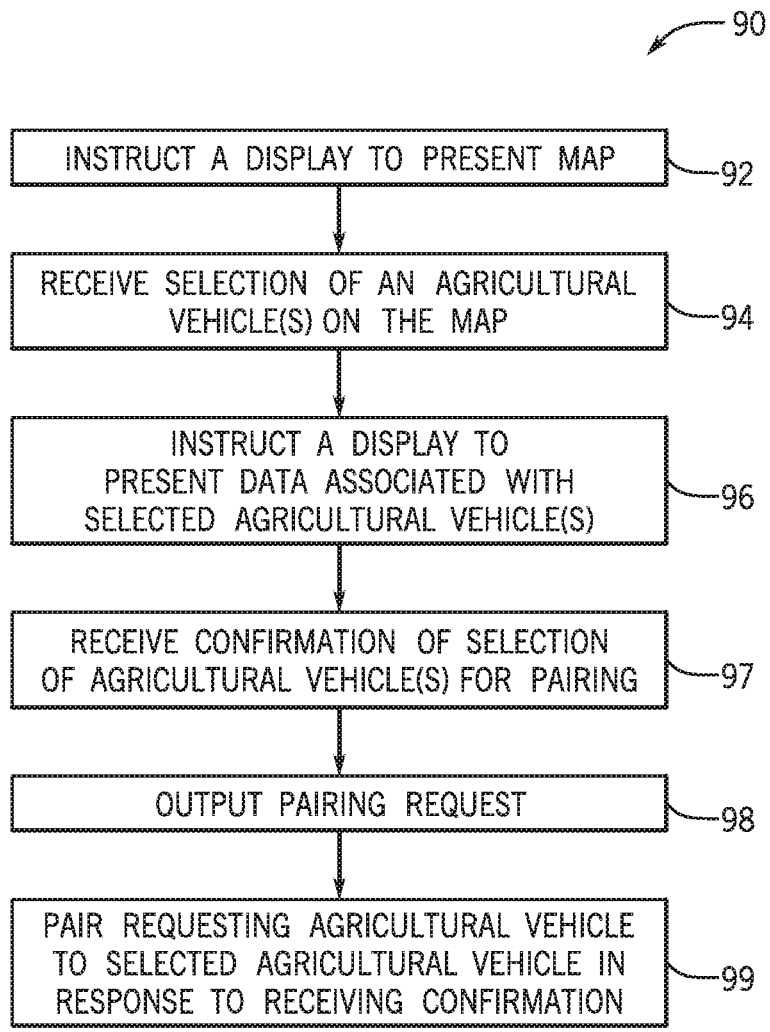
FIG. 3 is a flow diagram of an embodiment of a method for pairing between the agricultural vehicles of FIG. 2.

FIG. 3 is a flow diagram 90 of an embodiment of a method for pairing between the agricultural vehicles of FIG. 2. In some embodiments, the pairing may be enabled by using the communication protocol. The steps illustrated in the flow diagrams described herein (e.g., flow diagram 90 of FIG. 3, the flow diagram of FIG. 4, etc.) may be performed by the controller of the agricultural vehicle, a base station controller, or any other suitable processor-based computing device. Furthermore, the steps illustrated in the flow diagrams described herein (e.g., flow diagram 90 of FIG. 3, the flow diagram of FIG. 4, etc.) are meant to facilitate discussion and are not intended to limit the scope of this disclosure, since additional steps may be performed, certain steps may be omitted, and the illustrated steps may be performed in any suitable order, including the order disclosed herein. With the foregoing in mind, the controller may be configured to present (process block 92) a map of the field, as described in detail below. The map may include information (e.g., type of agricultural vehicle(s), distance(s) to (e.g., nearest) agricultural vehicle(s), etc.) associated with the agricultural vehicle being operated, an indication of the network signal strength, a pairing status to other agricultural vehicle(s) within the field, and the like. In some embodiments, the controller may present (process block 92) the map of the field on the display of the respective user interface. The map may include an icon corresponding to each of respective agricultural vehicle operating within the field. The controller may present the icons on a field region corresponding to the field, such that the positions of the icons within the field region correspond to the positions of the corresponding agricultural vehicles within the field.

Each icon may include an identifier to facilitate determination of an identity of the corresponding agricultural vehicle, and a status indicator to determine information associated with the corresponding agricultural vehicle. For example, for a harvester vehicle, the controller of the harvester vehicle may instruct the display to present the icons corresponding to the unpaired haul vehicles (e.g., available compatible agricultural vehicles) with a first color, the icons corresponding to the paired haul vehicles (e.g., unavailable compatible agricultural vehicles) with a second color, and the icons corresponding to other harvester vehicles 10 (e.g., incompatible agricultural vehicles) with a third color to facilitate identification of the various types of agricultural vehicles within the field. While colors are describes as the identifiers, in other embodiments, the identifier of each icon may include text, symbol(s), or any combination thereof, among other suitable identifiers, instead of or in addition to the above-mentioned color identifiers. In some embodiments, the position of the icon may be updated relative to the field region on the display based on the position of the agricultural vehicles within the field. As such, in some embodiments, the icons within the field region may be updated at or near real-time to substantially match the position of the corresponding agricultural vehicles within the field. The spatial locating devices of the agricultural vehicles may communicate position data to the controller to facilitate determining the position of the agricultural vehicles within the field to further enhance the accuracy of the map.

The controller may receive (process block 94) selection of an agricultural vehicle on the map. In some embodiments, after the controller presents the map with the icons, the icons may be selected by an operator. The selection of the agricultural vehicle may be realized via user inputs directly to the display (e.g., a touch screen) or to one or more input peripherals, such as buttons, dials, touch pads, keyboards, a mouse, microphones, and the like. In some embodiments, the user inputs may select the icon corresponding to the agricultural vehicle desired for selection.

In response to selection (process block 94) of an icon, the controller may instruct the display to present (process block 96) information associated with the agricultural vehicle corresponding to the selected icon. The presented information may include information helpful in deciding whether to pair with the selected agricultural vehicle. For example, an operator of a harvester vehicle may select an icon corresponding to a compatible agricultural vehicle, such as a haul vehicle. As a result, information associated with the haul vehicle, such as the capacity level (e.g., percent full), paired status, network signal strength, current state, and the like, may be presented. In another example, an operator of a haul vehicle may select an icon corresponding to a compatible agricultural vehicle, such as a harvester vehicle. As a result, information associated with the harvester vehicle, such as the capacity level (e.g., percent full), paired status, network signal strength to the network, current state, and the like, may be presented. While the examples described above include selection of compatible agricultural vehicles, in some embodiments, any device (e.g., the storage system) presented on the map may be selected, such that selection of the device causes the controller to instruct the display to present data associated with the selected device.

Furthermore, the controller may receive (process block 97) selection of an agricultural vehicle for pairing. For example, an operator may select one of the agricultural vehicles displayed on the map for pairing by selecting the agricultural vehicle via the display and/or via another suitable input device (e.g., mouse, keyboard, button, etc.). In response to receiving (process block 97) selection of the agricultural vehicle for pairing, the controller may output (process block 98) the pairing request. Then the controller may pair (process block 99) the requesting agricultural vehicle to the selected agricultural vehicle (e.g., to initiate docking and unloading operation). For example, the selected agricultural vehicle and the requesting agricultural vehicle may pair with one another and dock to one another. Harvested crops may then be unloaded from the harvester vehicle to the haul vehicle, and haul vehicle may transport the harvested crops to a target location (e.g., the storage system). In certain embodiments, the vehicles may not be paired until the selected agricultural vehicle approves the request from the requesting agricultural vehicle to pair. For example, the controller of the selected agricultural vehicle may instruct a display of a user interface to present the pair request from the requesting agricultural vehicle. The user interface may then receive an input from an operator of the selected agricultural vehicle approving or denying the request. If the request is approved, the controller of the requesting agricultural vehicle and/or the controller of the selected agricultural vehicle pair the agricultural vehicles with one another. While pairing two agricultural vehicles is described above, the method described herein may utilized for pairing more than two agricultural vehicles. Furthermore, in some embodiments, after pairing the requesting agricultural vehicle to the selected agricultural vehicle, the controller may instruct the display to present any number of widgets for controlling the requesting or selected agricultural vehicle and the various steps in performing the docking and unloading operations, for example. In addition, the controller may provide, via the display, an indication of the docked status during unloading.

Figure 4:
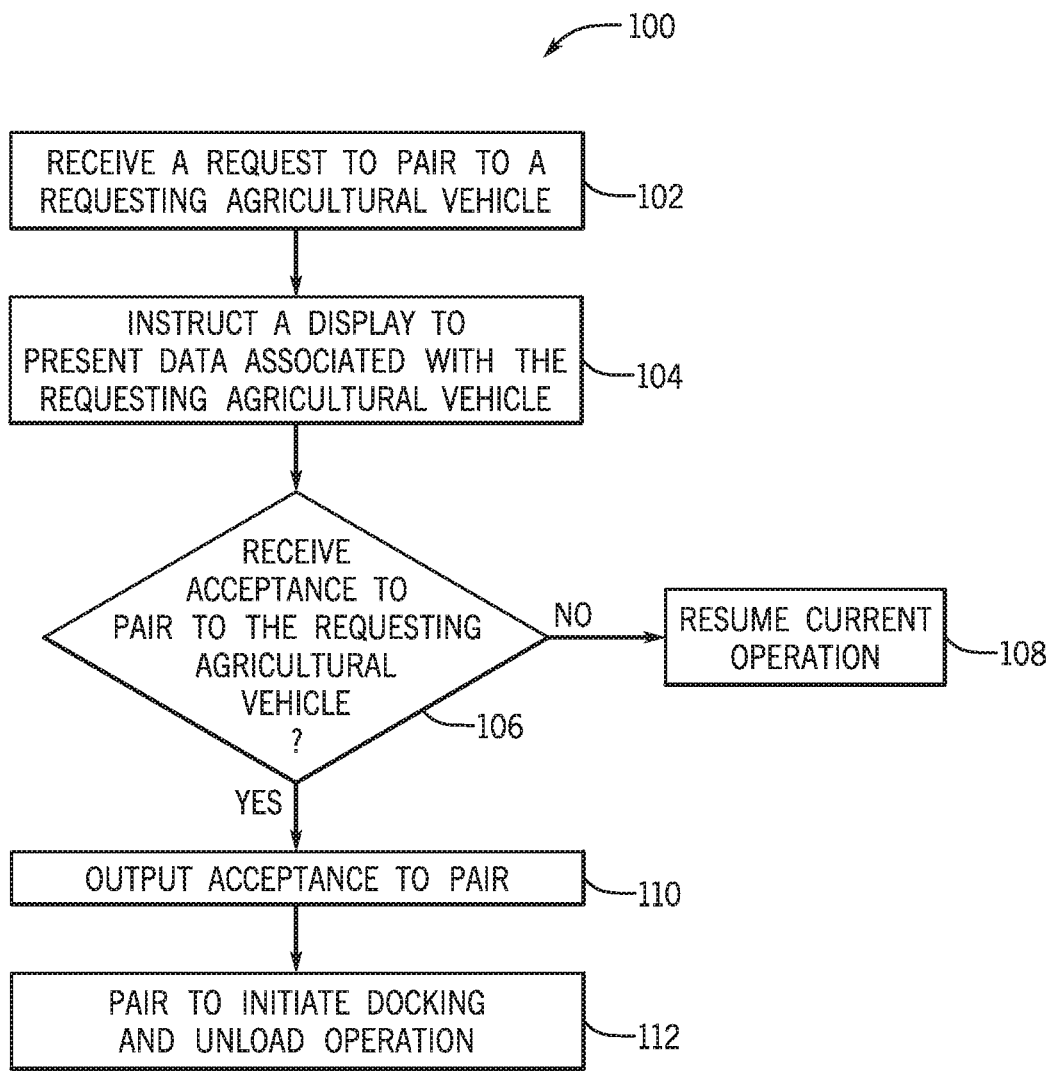
FIG. 4 is a flow diagram of an embodiment of a method for enabling pairing between the agricultural vehicles of FIG. 2.

FIG. 4 is a flow diagram 100 of an embodiment of a method for enabling pairing between the agricultural vehicles of FIG. 2. While the method of the flow diagram 90 of FIG. 3 may be performed by the requesting agricultural vehicle, the method of the flow diagram 100 of FIG. 4 may be performed by the controller of the agricultural vehicle selected for pairing by the requesting agricultural vehicle. In certain instances, the requesting agricultural vehicle may request to pair and the selected agricultural vehicle may accept the request from the requesting agricultural vehicle to pair. In some embodiments, the controller of the selected agricultural vehicle may receive (process block 102) the request to pair to the requesting agricultural vehicle. For example, an operator of a harvester vehicle may select and submit a request to pair with a haul vehicle. The haul vehicle may receive (process block 102) the request to pair with the requesting harvester vehicle.

The controller of the selected agricultural vehicle (in this example, the haul vehicle) may instruct the display of the user interface to present (process block 104) data associated with the requesting agricultural vehicle (in this example, the harvester vehicle). The presented information may include information helpful in deciding whether to pair with the requesting agricultural vehicle. For example, the controller of the selected haul vehicle may instruct the display to present (process block 104) information associated with the requesting harvester vehicle, such as the capacity level (e.g., percent full), paired status, network signal strength, current state, and the like.

Furthermore, the controller of the selected agricultural vehicle may also instruct the display of the user interface to present a selectable option for accepting the request to pair with the requesting agricultural vehicle. The controller may determine (decision block 106) whether an acceptance to pair with the requesting vehicle is received from the user interface (e.g., from the display, from another input device, etc.). For example, after instructing the display to present the selectable option for accepting the request to pair with the requesting agricultural vehicle, the controller of the selected agricultural vehicle may determine whether an affirmative selection of the selectable option is made. In response to not receiving selection of the selectable option and/or in response to receiving a negative selection of the selectable option, the selected agricultural vehicle resumes (process block 108) current operation. In some instances, resuming (process block 108) current operation includes not pairing with the requesting agricultural vehicle. In contrast, in response to receiving the acceptance to pair to the requesting agricultural (e.g., an affirmative selection of the selectable option), the controller may output (process block 110) a confirmation indicating acceptance to pair. In some embodiments, the confirmation indicating acceptance to pair may be presented on the display of the selected agricultural vehicle and/or the requesting agricultural vehicle, such that the confirmation may serve as a visual indication to the operator(s) that the selected and requesting agricultural vehicles are pairing (process block 112) (e.g., to initiate docking and unloading operations). In certain embodiments, after receiving the acceptance to pair to the requesting agricultural, the controller of the selected agricultural vehicle and/or the controller of the requesting agricultural vehicle may initiate (process block 112) the docking and unloading operations, as discussed above. While the requesting agricultural vehicle is the harvester vehicle and the selected agricultural vehicle is the haul vehicle in the example above, in certain embodiments, the requesting agricultural vehicle may be the haul vehicle and the selected agricultural vehicle may be the harvester vehicle. Furthermore, in certain embodiments, the requesting and/or selected agricultural vehicle may be the storage system, a repair system, another combine or harvester, or another suitable system/vehicle.

Figure 5:
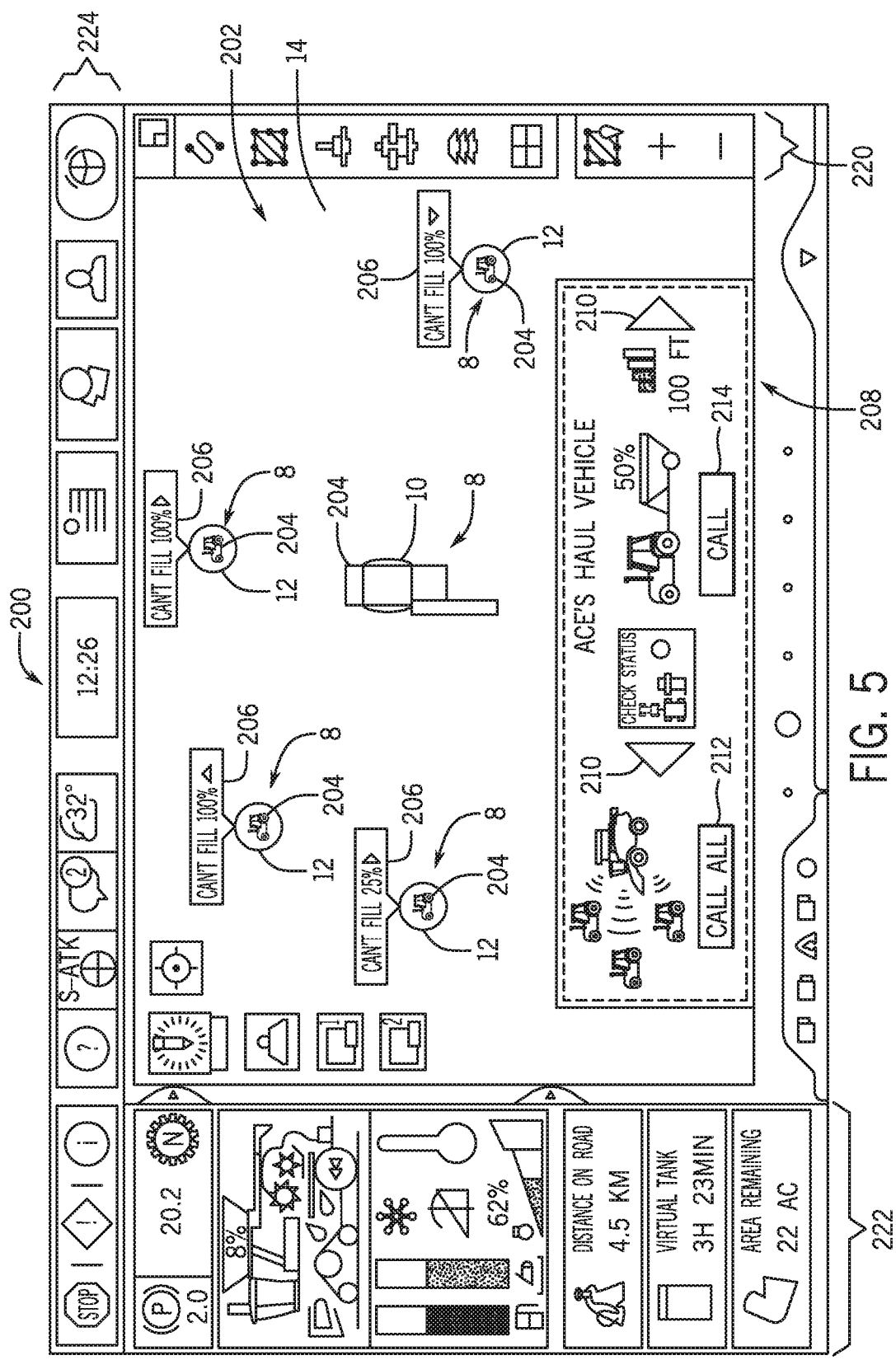
FIG. 5 is a schematic diagram of an embodiment of a screen that may be presented on a display of a user interface of an agricultural vehicle of the agricultural vehicles of FIG. 1.

FIG. 5 is a schematic diagram of a screen 200 that may be presented on a display of a user interface of an agricultural vehicle (e.g., harvester vehicle) of the agricultural vehicles of FIG. 1. In the illustrated embodiment, the screen 200 may be presented by a display of a harvester vehicle configured to communicatively couple with a haul vehicle. As discussed above, the controller may instruct the display to present a map 202 of the field 14, such that the map 202 includes icons 204 corresponding to each of the agricultural vehicles in operation within the field 14. Each icon 204 may include an identifier to facilitate determination of an identity of the corresponding agricultural vehicle 8. For example, the controller of a harvester vehicle may instruct the display to present the icons corresponding to the unpaired haul vehicles 12 (e.g., available compatible agricultural vehicles 8) with a first color, the icons corresponding to the paired haul vehicles 12 (e.g., unavailable compatible agricultural vehicles 8) with a second color, and the icons corresponding to other harvester vehicles 10 (e.g., incompatible agricultural vehicles 8) with a third color to facilitate identification of the various types of agricultural vehicles 8 within the field. In some embodiments, the icons 204 corresponding to the agricultural vehicles 8 may be selectable (e.g., via a touchscreen, external buttons, etc.).

In the illustrated embodiment, the controller instructs the display to present icons 204 corresponding to four compatible haul vehicles 12 and one harvester vehicle 10. The icons 204 may include a corresponding status indicator 206. For example, the status indicator 206 may provide information regarding capacity level (e.g., fill level of the storage compartment of the haul vehicle) (e.g., 25 percent full, 100 percent full, etc.) and may provide information regarding whether the haul vehicle may be additionally filled (e.g., "can be filled, "can't be filled," etc.). In some embodiments, the controller may instruct the display to present any number of suitable widgets for controlling the docking and unloading operation. For example, the widgets may include features for controlling the path of travel of the paired agricultural vehicles during the docking and unloading operation, an order of tasks to be performed, and so forth.

In some embodiments, the controller may receive selection of an icon 204 presented on the map 202. In response to selection of the icon 204, the controller may instruct a window having detailed information 208 associated with the respective agricultural vehicle 8 to be presented. The window of detailed information 208 may include information such as, the dock position, the capacity level (e.g., percent full), the network signal strength, the distance away way from the present vehicle, and the like, associated with the agricultural vehicle 8 corresponding to the selected icon 204. In some embodiments, the window of detailed information 208 may include selectable arrows 210 for navigating through a list of the compatible agricultural vehicles 8. For example, an operator of a harvester vehicle 10 may select a selectable arrow 210, such that the controller instructs the display to present detailed information 208 corresponding to another compatible agricultural vehicle 8, such as another haul vehicle 12. In the illustrated embodiment, the controller instructs the display to present detail information associated with "Ace's Haul Vehicle." In further embodiments, selection of a selectable arrow may cause the controller to instruct the display to present detail information of any subsequent agricultural vehicle 8 (e.g., harvester vehicles, haul vehicles, etc.) or device (e.g., storage system).

In some embodiments, the window of detailed information 208 may also include a selectable "Call All" prompt 212 that when selected causes the controller to output a request to all compatible agricultural vehicles 8 to pair, such that all available (e.g., "can fill") and compatible agricultural vehicles 8 (e.g., haul vehicles 12 are compatible with a harvester vehicle 10) may receive a request to pair with the requesting agricultural vehicle. In some embodiments, the compatible agricultural vehicles 8 may line-up in any particular (e.g., preset order) to sequentially pair with the requesting agricultural vehicle. In some embodiments, the window of detailed information 208 may include a call prompt 214 that, when selected, causes the controller of the agriculture vehicle to output a request to pair with the agricultural vehicle 8 included in the window of detailed information 208. In further embodiments, the agricultural vehicles may automatically pair (e.g., without operator input), for example, based on percent full, distance, and/or current state (e.g., pair/unpaired), among other factors. In some embodiments, the display may present selectable features for specifying a cart of the requested haul vehicle to fill. For example, the controller may present a selectable feature that may receive user inputs to specify which cart of the requested haul vehicle a harvester vehicle will unload harvested crops into.

Furthermore, in the illustrated embodiment, the screen 200 includes a navigation panel 220 for controlling presentation of the map 202 and for controlling the agricultural vehicle. For example, the navigation panel 220 may include selectable features for controlling the agricultural vehicle 8, changing a view of the map 202, displaying additional details on the map 202, and the like. Additionally, in the illustrated embodiment, the screen 200 includes an information overview 222, including information associated with the agricultural vehicle 8 presenting the map 202. For example, the information overview 222 may include the ground speed (e.g., 20.2 mph), the capacity level (e.g., 8 percent full), various fluid levels, the distance covered (e.g., 4.5 km), the time remaining before all fuel is consumed (e.g., 3 hours and 23 minutes), the area (e.g., 22 acres) remaining to service (e.g., harvest crops), and the like. In addition, the screen 200 may include a top panel 224 for presenting any suitable data helpful in pairing agricultural vehicles 8, such as frequently asked questions, a compass, outstanding messages, a temperature, a clock, and the like. In further embodiments, the navigation panel 220, the information overview, and the top panel 224 may be presented at any suitable position on the screen 200.

Figure 6:
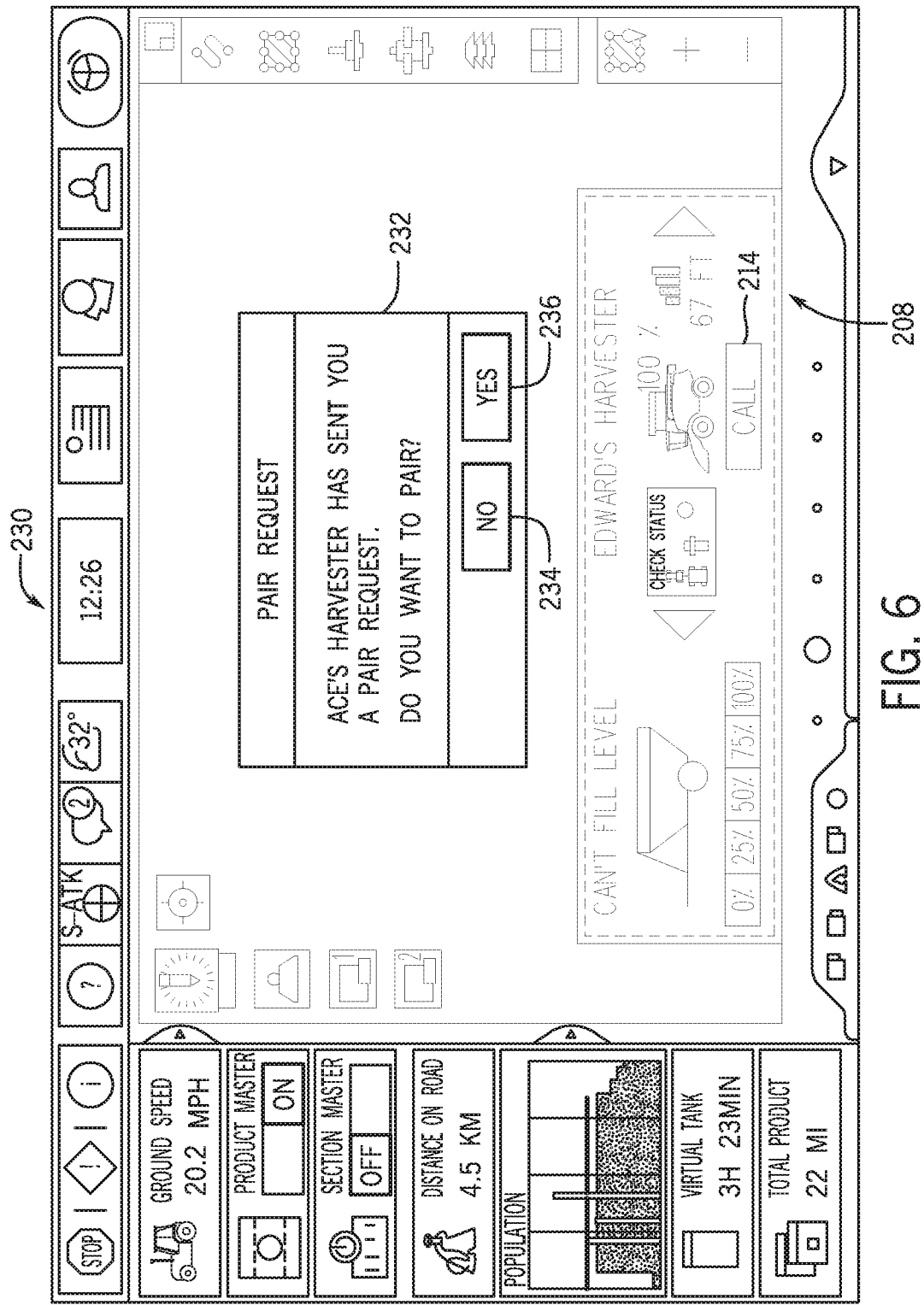
FIG. 6 is a schematic diagram of an embodiment of a screen having a confirmation prompt for confirming selection of an agricultural vehicle of the agricultural vehicles of FIG. 1 for pairing.

FIG. 6 is a schematic diagram of an embodiment of a screen 230 having a confirmation prompt 232 for confirming selection of an agricultural vehicle 8 of the agricultural vehicles of FIG. 1 for pairing. For example, in the embodiment illustrated in FIG. 5, a harvester vehicle 10 selects a haul vehicle 12 for pairing to initiate docking and unloading operations. As illustrated in FIG. 6, the selected agricultural vehicle (e.g., the selected haul vehicle) may then receive the pairing request from the requesting agricultural vehicle (e.g., the requesting harvester vehicle of FIG. 5), such that the controller of the selected agricultural vehicle instructs the respective display to present the confirmation prompt 232 including a first selectable command 234 (e.g., "No") for not accepting the pairing request. If "No" is selected, pairing between the requesting agricultural vehicle and the selected agricultural vehicle is not enabled. In addition, the controller of the selected agricultural vehicle instructs the respective display to present the confirmation prompt 232 including a second selectable command 236 (e.g., "Yes") for accepting the pairing request. If "Yes" is selected, pairing between the requesting agricultural vehicle and the selected agricultural vehicle is enabled7.

Figure 7:
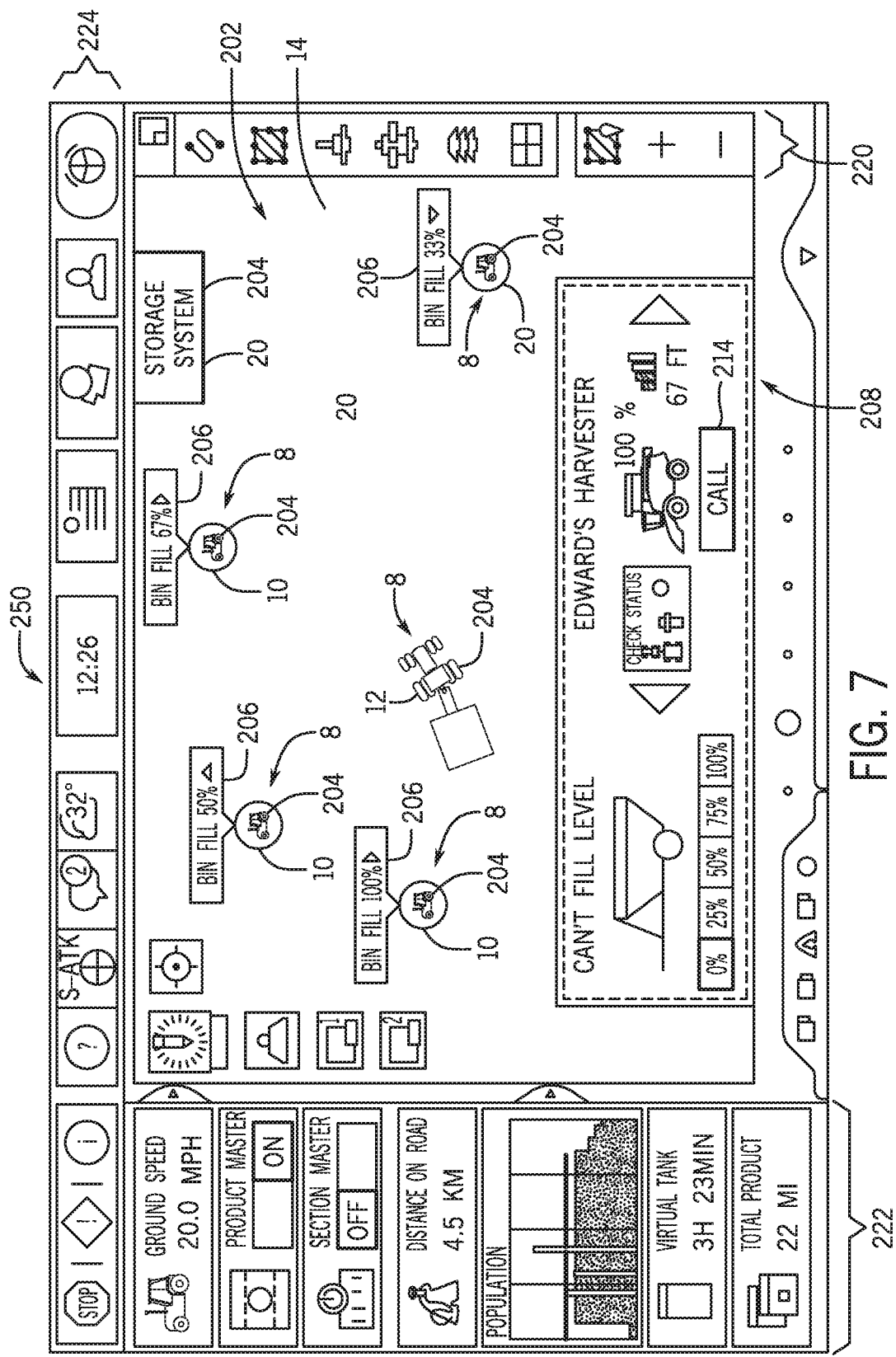
FIG. 7 is a schematic diagram of an embodiment of features presented by a display of a user interface of an agricultural vehicle of the agricultural vehicles of FIG. 1.

FIG. 7 is a schematic diagram of an embodiment of a screen 250 that may be presented on a display of a user interface of an agricultural vehicle 8 (e.g., haul vehicle) of the agricultural vehicles 8 of FIG. 1. In the illustrated embodiment, the controller may instruct the display to present features configured to more efficiently accomplish agricultural operations, such as docking and unloading operations. As discussed above, the controller may present the map 202 of the field 14, such that the map 202 includes icons 204 corresponding to each of the agricultural vehicles 8 in operation within the field 14. Each icon 204 may include an identifier to facilitate determination of an identity of the corresponding agricultural vehicle 8. For example, the controller of a haul vehicle 12 may instruct the display to present the icons corresponding to the unpaired harvester vehicles 10 (e.g., available compatible agricultural vehicles 8) with a first color, the icons corresponding to the paired harvester vehicles 10 (e.g., unavailable compatible agricultural vehicles 8) with a second color, and the icons corresponding to other haul vehicles 12 (e.g., incompatible agricultural vehicles 8) with a third color to facilitate identification of the various types of agricultural vehicles 8 within the field. In some embodiments, the icons 204 corresponding to the agricultural vehicles 8 may be selectable (e.g., via a touchscreen, external buttons, etc.). In the illustrated embodiment, the controller may instruct the display to present icons 204 corresponding to four compatible harvester vehicles 10 and one haul vehicle 12. The icons 204 may include a corresponding status indicator 206. For example, the status indicator 206 may include information regarding the capacity level of the harvester vehicle 10 (e.g., 33, 67, 50, and 100 percent full, 100 percent full, etc.). In some embodiments, the haul vehicle 12 may automatically pair with a harvester vehicle 10 in response to the percent full exceeding a certain threshold value, such as 50 percent full, 67 percent full, 75 percent full, 80 percent full, or any other suitable percent full.

In some embodiments, the controller 43 may receive selection of an icon 204 presented on the map 202. Selection of the icon 204 causes a window of detailed information 208 associated with the agricultural vehicle 8 corresponding to the selected icon 204 to be presented. The window of detailed information 208 may include information such as the dock position, the capacity level (e.g., percent full), the network signal strength, the distance away (e.g., 67 feet) from the selected agricultural vehicle, and the like, associated with the agricultural vehicle 8 corresponding to the selected icon 204. In some embodiments, the window of detailed information 208 may include selectable arrows 210 for navigating through a list of the compatible agricultural vehicles 8. For example, an operator of a haul vehicle 12 may select a selectable arrow 210, and the controller, in turn, may instruct the display to present detailed information 208 corresponding to another compatible agricultural vehicle 8, such as another harvester vehicle 10. In the illustrated embodiment, the controller instructs the display to present detailed information associated with "Edward's Harvester." In further embodiments, selection of a selectable arrow may cause the controller to instruct the display to present detailed information of any subsequent agricultural vehicle (e.g., harvester vehicles, haul vehicles, etc.) or device (e.g., storage system). In some embodiments, the detailed information 208 may include a capacity level (e.g., percent full) of the agricultural vehicle 8 (e.g., haul vehicle) corresponding to the selected icon 204. While in the illustrated embodiment, the controller may instruct the display to present specific percentages, such as 0, 25, 50, 75, and 100 percent, in further embodiments, the controller may instruct the display to present any suitable percentage values or another suitable indicator of fill quantity (e.g., fill weight, fill height, etc.).

In some embodiments, the window of detailed information 208 may include a call prompt 214 that, when selected, causes the controller to output a request to pair with the agricultural vehicle 8 presented in the window of detailed information 208 (e.g., "Edwards's Harvester). In further embodiments, the agricultural vehicles may automatically pair (e.g., without operator input), for example, based on current fill level and distance between vehicles, among other factors. In further embodiments, the window of detailed information 208 may also include a selectable "Call All" prompt that when selected causes the controller to output a request to all compatible agricultural vehicles 8 to pair, such that all available (e.g., "can fill") and compatible (e.g., a harvester vehicle is compatible with a haul vehicles) agricultural vehicles 8 receive a request to pair with the requesting agricultural vehicle. While the example described in FIG. 7 discloses systems and methods for a haul vehicle 12 to request pairing with harvester vehicles 10, the embodiments disclosed herein may be used for a haul vehicle 12 or a harvester vehicle 10 to request pairing with other devices (e.g., storage system, etc.) in the field and present on the map 202. As discussed above, in some embodiments, after pairing the requesting agricultural vehicle to the selected agricultural vehicle, the controller may instruct the display to present any number of widgets for controlling the requesting or selected agricultural vehicle and the various steps in performing the docking and unloading operations, for example. In addition, the controller may provide, via the display, an indication of the docked status during unloading.

Present techniques and systems may be implemented by agricultural vehicles to facilitate pairing with one another, thereby enabling the agricultural vehicles to accomplish any suitable operation, such as docking and unloading operations, and storage operations. In some instances, the controller of one agricultural vehicle may instruct a display to present a map of a field, including other agricultural vehicles within the field. The map may also include useful information that facilitates operator selection of an agricultural vehicle for pairing. The controller may receive a signal (e.g., from a user interface) indicative of selection of an agricultural vehicle. The controller, in turn, may output a signal indicative of a request to pair with the selected agricultural vehicle. In response to receiving the request to pair from the requesting agricultural vehicle, the controller of the selected agricultural vehicle may instruct a display to present a prompt that enables an operator to confirm pairing with the requesting agricultural vehicle. In response to confirming the request to pair from the requesting agricultural vehicle, the two agricultural vehicles may pair with one another to initiate certain operations, such as docking and unloading operation, storage operations, and the like.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system of a first agricultural system comprises:
   a first controller comprising a processor and a memory, wherein the first controller is configured to:
      instruct a display to present a map of a work area, wherein the map comprises a selectable icon corresponding to a second agricultural system, and the selectable icon is positioned at a location on the map corresponding to a position of the second agricultural system within the work area;
      receive selection of the selectable icon;
      output a request to pair with the second agricultural system in response to receiving the selection;

pair the first agricultural system with the second agricultural system in response to receiving a pairing confirmation from the second agricultural system; and disable selection of the selectable icon in response to determining that the first agricultural system is not compatible with the second agricultural system.

2. The control system of claim 1, wherein the first controller is configured to coordinate performance of an operation within the work area with a second controller of the second agricultural system in response to pairing the first agricultural system with the second agricultural system.

3. The control system of claim 2, wherein one of the first and second agricultural systems comprises a harvester vehicle, the other of the first and second agricultural systems comprises a haul vehicle, and the operation comprises a docking and unloading operation.

4. The control system of claim 2, wherein one of the first and second agricultural systems comprises a haul vehicle, the other of the first and second agricultural systems comprise a storage system, and the operation comprises a storage operation.

5. The control system of claim 1, wherein the first controller is configured to pair the first agricultural system with the second agricultural system in response to a first product level of the first agricultural system being above a first threshold value or in response to a second product level of the second agricultural system being above a second threshold value.

6. The control system of claim 1, comprising a first transceiver communicatively coupled to the first controller, wherein the first transceiver is configured to communicate with a second transceiver of the second agricultural system via a communication network.

7. The control system of claim 1, wherein the first controller is configured to output data to a second controller of the second agricultural system, to receive data from the second controller of the second agricultural system, or a combination thereof, wherein the data comprises information indicative of a position of the respective agricultural system, a distance between the first and second agricultural systems, a role of the respective agricultural system, or a combination thereof.

8. The control system of claim 1, wherein the first controller is configured to instruct the display to present a "call" prompt, and to output the request to pair the first agricultural system with the second agricultural system in response to receiving selection of the "call" prompt.

9. The control system of claim 1, wherein the map comprises an indication of a capacity level of the first agricultural system, a capacity level of the second agricultural system, a paired status of the first agricultural system, a paired status of the second agricultural system, a signal strength at a first transceiver of the first agricultural system, a signal strength at a second transceiver of the second agricultural system, a current state of the first agricultural system, a current state of the second agricultural system, a dock position of the first agricultural system, a dock position of the second agricultural system, a distance between the first and second agricultural systems, or a combination thereof.

10. A method for pairing a first agricultural system with a second agricultural system, comprising:
instructing, via a processor, a display of a first agricultural system to present a map of a work area, wherein the map comprises a selectable icon corresponding to the second agricultural system, and the selectable icon is positioned at a location on the map corresponding to a position of the second agricultural system within the work area;

receiving, via the processor, selection of the selectable icon;

outputting, via the processor, a request to pair with the second agricultural system in response to receiving the selection;

pairing, via the processor, the first agricultural system with the second agricultural system in response to receiving a pairing confirmation from the second agricultural system; and disabling, via the processor, selection of the selectable icon in response to determining that the first agricultural system is not compatible with the second agricultural system.

11. The method of claim 10, comprising coordinating, via the processor, performance of an operation within the work area with the second agricultural system in response to the pairing.

12. The method of claim 10, comprising:
instructing, via the processor, the display to present a "call" prompt; and
outputting, via the processor, the request to pair the first agricultural system with the second agricultural system in response to receiving selection of the "call" prompt.

13. The method of claim 10, wherein the map comprises an indication of a capacity level of the first agricultural system, a capacity level of the second agricultural system, a paired status of the first agricultural system, a paired status of the second agricultural system, a current state of the first agricultural system, a current state of the second agricultural system, a dock position of the first agricultural system, a dock position of the second agricultural system, a distance between the first and second agricultural systems, or a combination thereof.

14. A control system of a first agricultural system, comprising:
a user interface comprising a display;
a first transceiver configured to communicatively couple to a second transceiver of a second agricultural system; and
a first controller communicatively coupled to the user interface and to the first transceiver, wherein the first controller comprises a processor and a memory, and the first controller is configured to:
instruct the display to present a map of a work area, wherein the map comprises a selectable icon corresponding to the second agricultural system, and the selectable icon is positioned at a location on the map corresponding to a position of the second agricultural system within the work area;
receive selection of the selectable icon;
output a request to pair with the second agricultural system in response to receiving the selection;
pair the first agricultural system with the second agricultural system in response to receiving a pairing confirmation from the second agricultural system; and
disable selection of the selectable icon in response to determining that the first agricultural system is not compatible with the second agricultural system.

15. The control system of claim 14, wherein the first transceiver is configured to communicate with the second transceiver via a communication network.

16. The control system of claim 14, wherein the first controller is configured to output data to a second controller of the second agricultural system, to receive data from the second controller of the second agricultural system, or a combination thereof, wherein the data comprises information indicative of a position of the respective agricultural system, a distance between the first and second agricultural systems, a role of the respective agricultural system, or a combination thereof.

17. The control system of claim 14, wherein the first controller is configured to instruct the display to present a "call all" prompt, and to output the request to pair the first agricultural system with the second agricultural system in response to receiving selection of the "call all" prompt.

* * * * *